(12) United States Patent
Choi et al.

(10) Patent No.: US 7,206,333 B2
(45) Date of Patent: Apr. 17, 2007

(54) CHANNEL TRANSMISSION SYMBOL GENERATING SYSTEM FOR A MULTI-CARRIER COMMUNICATION SYSTEM FOR REDUCTION OF MULTIPLE ACCESS INTERFERENCE AND METHOD THEREOF

(75) Inventors: Kwon-Hue Choi, Daejeon (KR); Soo-Young Kim, Daejeon (KR); Kwang-Jae Lim, Daejeon (KR); Deock-Gil Oh, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 770 days.

(21) Appl. No.: 10/410,832

(22) Filed: Apr. 9, 2003

(65) Prior Publication Data

US 2004/0066839 A1 Apr. 8, 2004

(30) Foreign Application Priority Data

Oct. 7, 2002 (KR) ...................... 10-2002-0060989

(51) Int. Cl.
 H04B 1/00 (2006.01)
(52) U.S. Cl. ...................................................... 375/146
(58) Field of Classification Search ................ 375/146, 375/260; 370/331–334; 455/436–439, 442
See application file for complete search history.

(56) References Cited

U.S. PATENT DOCUMENTS

| | | | | |
|---|---|---|---|---|
| 5,729,570 A | * | 3/1998 | Magill | 375/149 |
| 6,952,454 B1 | * | 10/2005 | Jalali et al. | 375/260 |
| 2002/0006157 A1 | * | 1/2002 | Hunton | 375/146 |
| 2002/0136176 A1 | * | 9/2002 | Abeta et al. | 370/335 |
| 2003/0058881 A1 | * | 3/2003 | Wu et al. | 370/444 |

\* cited by examiner

*Primary Examiner*—Emmanuel Bayard
*Assistant Examiner*—Lawrence Williams
(74) *Attorney, Agent, or Firm*—Blakely Sokoloff Taylor & Zafman

(57) ABSTRACT

Disclosed is a method for using a different symbol timing for users so as to reduce a multiple access interference component in a multi-carrier code division multiple access (MC-CDMA) system. For this purpose, the presented invention involves dividing the users of the MC-CDMA system into two groups and applying an offset to the symbol timing between the user groups to cause a symbol transition of the opposite user group in the middle of the symbol interval, thereby reducing the multiple access interference component included in a symbol decision variable after a chip combination.

11 Claims, 4 Drawing Sheets

CHANNEL TRANSMISSION SYMBOL GENERATING SYSTEM FOR A MULTI-CARRIER COMMUNICATION SYSTEM FOR REDUCTION OF MULTIPLE ACCESS INTERFERENCE AND METHOD THEREOF

BACKGROUND OF THE INVENTION (a) Field of the Invention

The present invention relates to a multi-carrier code division multiple access (MC-CDMA) system. More specifically, the present invention relates to an MC-CDMA system for reducing a multiple access interference component in a frequency-selective fading channel environment.

(b) Description of the Related Art

In general, the MC-CDMA system uses orthogonal codes for multiple users or multiple data channels and carries orthogonal code chips multiplied by each data symbol on a different carrier.

A conventional technology for the MC-CDMA system is disclosed in U.S. Pat. No. 5,729,570, which method involves multiplying each user signal by an orthogonal code for spreading and transmitting the multiplied user signal on multi-carriers. This method guarantees a diversity effect in a frequency-selective fading environment, but generates an interference signal due to a loss of orthogonality among the user signals under frequency selective fading channels.

FIG. 1 is a schematic of a channel transmission symbol generating system in an MC-CDMA system according to prior art.

The channel transmission symbol generating circuit of the conventional MC-CDMA system comprises, as shown in FIG. 1, a code spreader 101, an interleaver 102, a serial-to-parallel converter 103, an inverse fast Fourier transform (IFFT) section 104, a parallel-to-serial converter 105, and a guard time inserter 106.

The code spreader 101 multiplies the data symbol of each user by an N-dimensional orthogonal code to spread the data symbol at a ratio of 1:N.

The interleaver 102 interleaves the spread signal from the code spreader 101 using an M by N block interleaver.

The serial-to-parallel converter 103 converts the serial chip stream into the parallel stream with size of MN chips. The IFFT section 104 receives the interleaved and serial-to-parallel converted signal and converts each sub-carrier signal to a time-domain signal to generate a multi-carrier signal.

The parallel-to-serial converter 105 converts the array of the signals from the IFFT section 104 to a serial arrangement.

Finally, the guard time inserter 106 adds a cyclic prefix to the parallel-to-serial converted signals to insert a guard time for transmission.

This MC-CDMA system enables a receiver to achieve a diversity effect in a frequency-selective fading environment by combining information on the individual carriers.

However, the non-uniform channel gain of each carrier causes a loss of orthogonality among users while combining chips at the receiver, thus generating an interference signal between the users. The interference component, if comparable to the thermal noise component, may have an critical effect on the system performance.

SUMMARY OF THE INVENTION

The object of this invention is to solve the problems with the prior art and to provide an MC-CDMA transmission apparatus and method for reducing an interference signal among users caused under a frequency-selective fading environment in an MC-CDMA system.

In one aspect of the present invention, there is provided a channel transmission symbol generating system for a multi-carrier communication that includes: a user grouping section for dividing users into a plurality of groups each having a different symbol timing offset; a code spreader for allocating a different orthogonal code to each user, and spreading signals; an interleaver for interleaving a chip signal spread by the code spreader, among the data symbols; a serial-to-parallel converter for converting the interleaved chip signal into the parallel signal; an inverse fast Fourier transform (IFFT) section for output from the serial-to-parallel converter to generate a multi-carrier output signal; a parallel-to-serial converter for converting the output signal of the IFFT section in a serial transmission data form; a guard time inserter for inserting a guard time into the output signal of the serial-to-parallel converter; and a symbol timing offset delaying section for delaying the user group signals by predetermined timing offsets to differentiate a symbol timing among the user groups.

The channel transmission symbol generating system further includes a summation section for combining the signals of the plural groups output from the guard time inserter and the symbol timing offset delaying section.

In addition, the channel transmission symbol generating system further includes: a chip code processor for converting the code of the interleaved chips of each user group so as to compensate for a phase difference caused by a delay difference among the user groups; the first switch for sequentially processing the group-based user signals fed into the IFFT section; and the second switch for sequentially inputting the group-based user signals output from the IFFT section into the parallel-to-serial converter.

The user grouping section classifies the users so as to minimize a difference in the total transmission power among the groups.

In the user grouping section, the users are divided into a user group A and a user group B, The chip code processor converts the code of the interleaved output signals of the user group B every other chip. The symbol timing offset delaying section delays the symbol timing of the user group B by a half-period of the output signal of the IFFT section.

The guard time added by the guard time insertion has a length given by the following equation:

$$T_g = (k/M)T_s$$

where $T_s$ is the length of the IFFT symbol; M is the number of parallel transmission symbols corresponding to an interleaving depth; and k is a nonnegative integer.

In another aspect of the present invention, there is provided a channel transmission symbol generating method for a multi-carrier communication that includes: (a) dividing users into a plurality of groups each having a different symbol timing offset; (b) allocating a different orthogonal code to each user to spread signals, and summing up the spread signals group by group; (c) interleaving the spread chip signals among the data symbols for each user group and converting them to parallel signals; (d) sequentially IFFT-operating the serial-to-parallel converted signals by the respective user groups and generating multi-carrier output signals; (e) converting the IFFT signals in a serial transmission data form and inserting a guard time; and (f) delaying the signals of each user group by a predetermined time to differentiate the symbol timing of each user group, and summing up the signals of the group-based users.

The channel transmission symbol generating method further includes: (g) converting the code of the interleaved chips of each user group so as to compensate for a phase difference caused by a delay difference among the user groups in the step (d).

The step (a) includes classifying the users so as to minimize a difference in the total transmission power among the groups.

In the step (a), the users are divided into a user group A and a user group B.

The step (f) includes delaying the symbol timing of the user group B by a half-period of the output signal of the IFFT section.

The guard time added in the step (e) has a length given by the following equation:

$$T_g = (k/M)T_s$$

where $T_s$ is the length of the IFFT symbol; M is the number of parallel transmission symbols corresponding to an interleaving depth; and k is a nonnegative integer.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The MC-CDMA system maintains orthogonality among user signals despite a timing offset among user symbols, when the spreading code of each user corresponding to each carrier is fixed in a non-fading environment. But, in a fading environment, a symbol transition of another user occurs in the symbol interval of each user due to the symbol timing offset among the users to reduce the interference power, when non-orthogonality among the users causes an interference component.

The present invention, which utilizes the above-stated characteristic, is for reducing the interference components among the users in a frequency-selective fading environment by dividing the users into two groups and applying an offset to the symbol timing between the two user groups.

Figure 1:
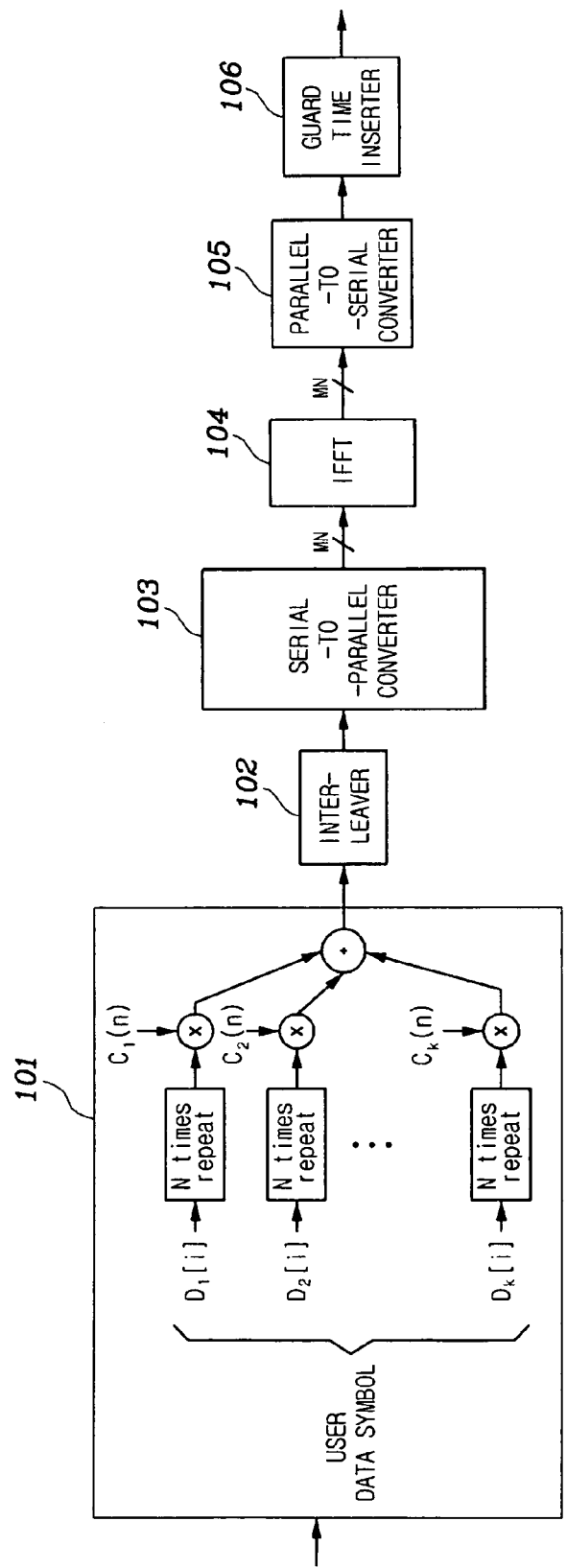
FIG. 1 is a schematic of a channel transmission symbol generating system of an MC-CDMA system according to prior art.
Figure 2:
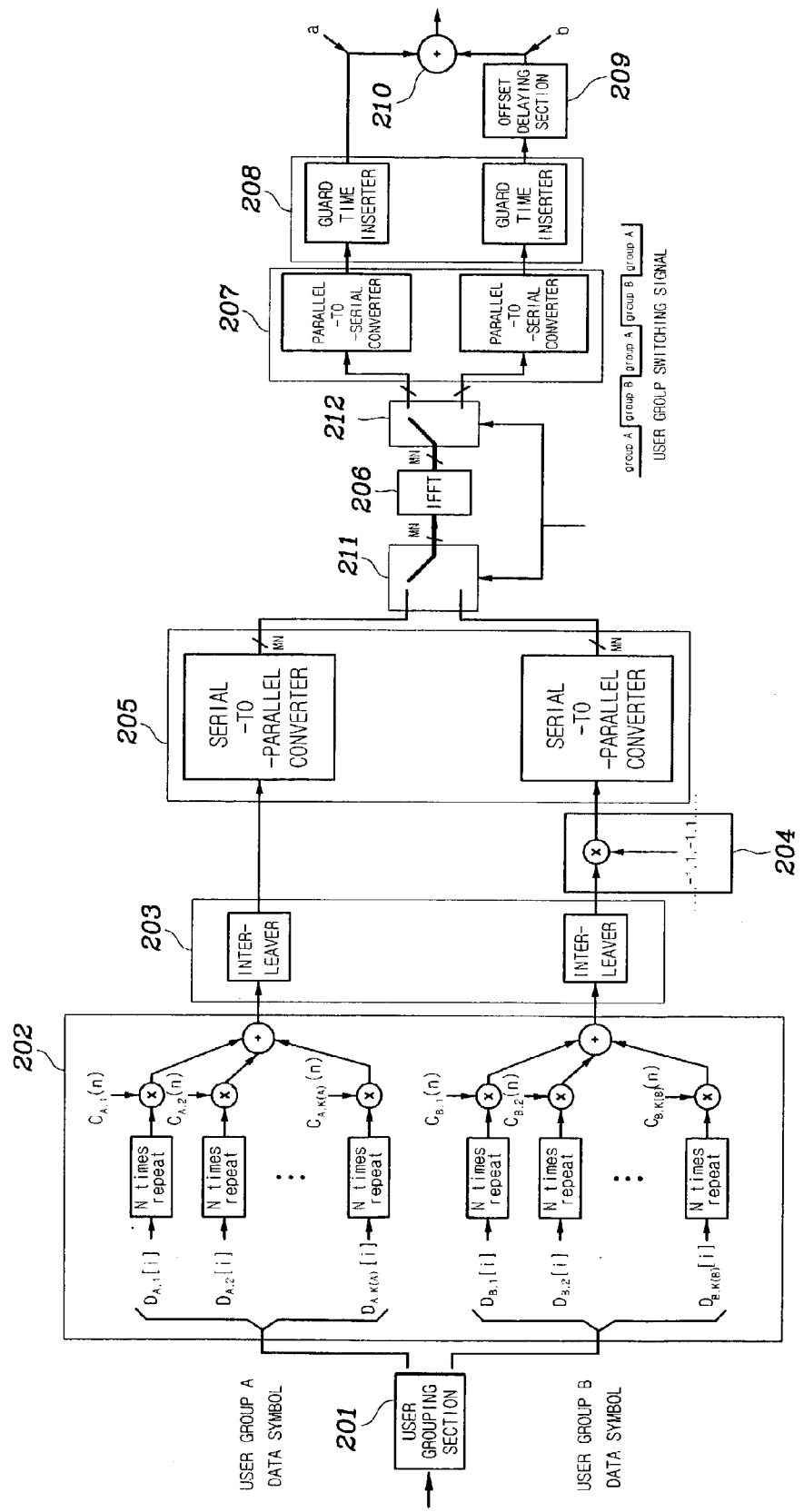
FIG. 2 is a schematic of a channel transmission symbol generating system of an MC-CDMA system according to an embodiment of the present invention.

FIG. 2 is a schematic of a channel transmission symbol generating system in a transmitter of an MC-CDMA system according to an embodiment of the present invention.

The MC-CDMA channel transmission symbol generating system according to the embodiment of the present invention comprises, as shown in FIG. 2, a user grouping section 201, a code spreader 202, an interleaver 203, a chip code processor 204, a serial-to-parallel converter 205, an IFFT section 206, a parallel-to-serial converter 207, a guard time inserter 208, and a symbol timing offset delaying section 209.

The user grouping section 201 sets a symbol timing offset at either zero or a half of the symbol period to determine the symbol timing offset of the individual users, and divides the users into a group A for users whose symbol timing offset is zero, and a group B for users whose symbol timing offset is a half of the symbol period.

The code spreader 202 multiplies the data symbol of each user in either group by an N-dimensional orthogonal code assigned for the user, and thereby performs a code spreading to generate a chip array having a chip length of N.

The interleaver 203 interleaves the chips of the spread signals from the code spreader 202 among the M neighboring transmission symbols.

The chip code processor 204 converts the code of the chip for the signal of each user in the user group B among the interleaved signals, every other chip. This is for compensating for a carrier frequency phase difference between the two user groups caused by the symbol timing error of the two user groups that corresponds to a half-period of IFFT.

The serial-to-parallel converter 205 converts the MN chip array of either group to a parallel arrangement. The IFFT section 206 performs a time division IFFT operation for each chip vector signal having a length of MN parallel chips.

The parallel-to-serial converter 207 converts the array of the chip vector signals of either group from the IFFT section 206 to a serial arrangement. The guard time inserter 208 adds a cyclic prefix to the parallel-to-serial converted signals to insert a guard time.

In addition, the symbol timing offset delaying section 209 delays the signals of the user group B with an inserted guard time by a time corresponding to a half of the transmission symbol period with the inserted guard time. The signals of the two groups are summed by a summation section 210.

First switch 211 sequentially performs IFFT-operations the output signals of the serial-to-parallel converter 205 group by group. Second switch 212 inputs the IFFT signals into the parallel-to-serial converter 207 group by group.

Now, a description will be given as to a transmit signal generating process in the MC-CDMA system according to the embodiment of the present invention with reference to the accompanying drawings.

Figure 3:
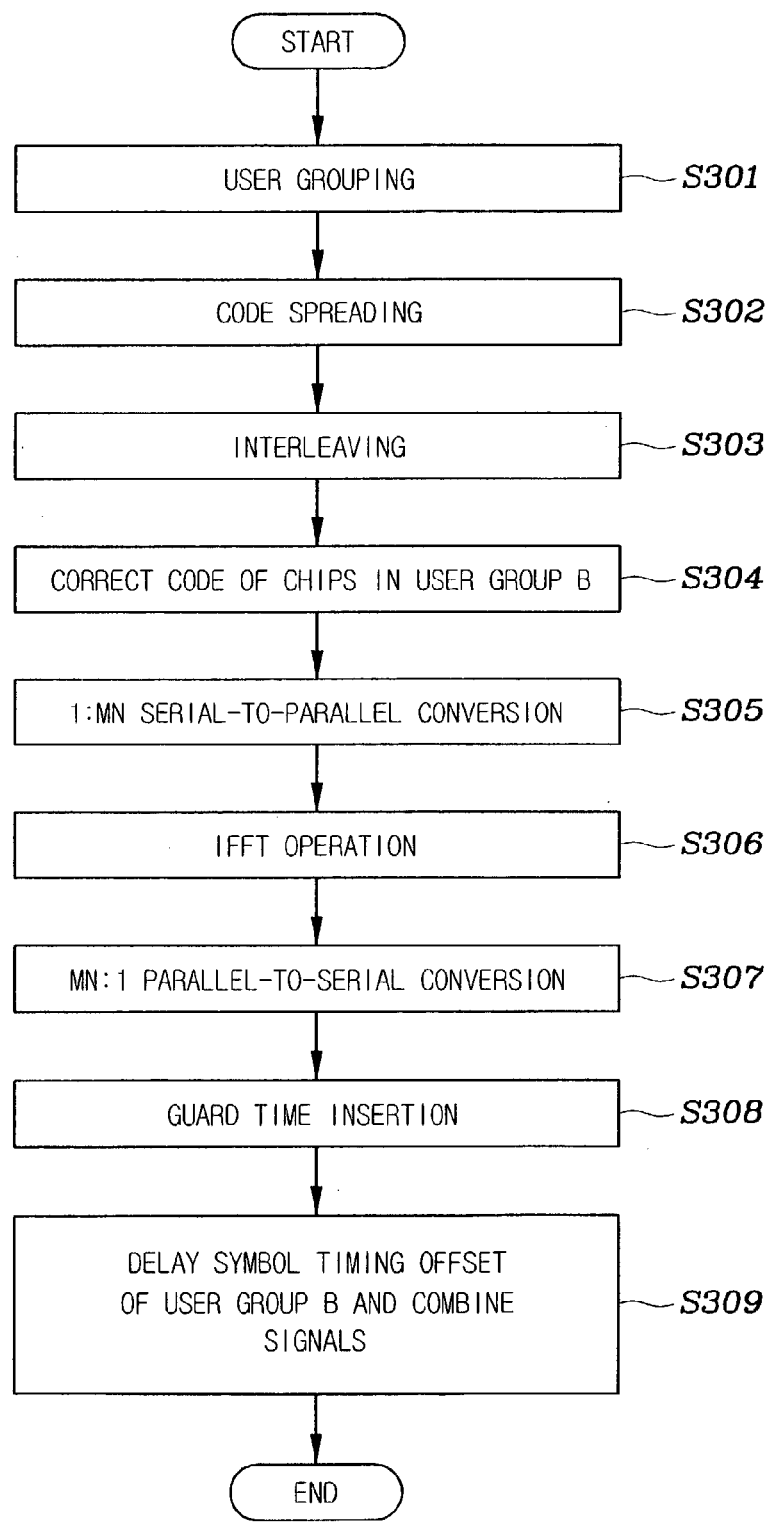
FIG. 3 is a flow chart showing a signal generating process in the MC-CDMA system according to the embodiment of the present invention.

FIG. 3 is a flow chart showing a signal generating process in the MC-CDMA system according to the embodiment of the presented invention.

As shown in FIG. 3, the user grouping section 201 classifies users into groups A and B. For a system with the uniform transmission powers among users, the difference in the number of users between the two groups is 0 or 1. But, for a non-uniform transmission power system, the users are grouped so as to minimize a difference in the total transmission power between the two group signals and equally allocate the interference power to the two user groups, thereby minimizing the average symbol error rate of users, in step 301.

The data symbol of each user included in either group is multiplied by an N-dimensional orthogonal code assigned for each user to spread the signals at a ratio of 1:N and sums them up, in step 302.

Subsequently, the interleaver 203 rearranges the spread chip signals of either group from the code spreader 202 for a symbol interval of M parallel transmission data symbols using an M:N interleaver and outputs the rearranged chip signals into coded data, in step 303.

The chip code processor 204 converts the chip code of each signal of the users in the group B among the interleaved signals every other chip, in step 304. This is for compensating for a carrier frequency phase difference between the two user groups caused by the symbol timing error of the two user groups that corresponds to a half-period of IFFT.

The serial-to-parallel converter 205 converts the interleaved signals of the group A and the code-processed signals of the group B in a 1:MN parallel arrangement, in step 305.

The serial-to-parallel converted user chip vector signals are modulated on sub-carriers for either user group by the IFFT section 206 and converted to overlapped multi-carrier signals, in step 306. In the meantime, the chip vector signals of either group are IFFT-operated in a sequential manner rather than simultaneously, thereby reducing the hardware complexity.

The parallel-to-serial converter 207 converts the sequentially IFFT-operated signals of either group in an MN:1 serial arrangement, in step 307.

Then, the guard time inserter 208 attaches a cyclic prefix to the parallel-to-serial converted signals to insert a guard time, in step 308. Finally, the signals of the users in the group B with the inserted guard time are delayed by a half-period of IFFT at the symbol timing offset delaying section 209, in step 309. The signals of the two groups are then summed, in step 310.

The length $T_g$ of the inserted guard time is given by the following equation so that the relative sub-carrier phase rotation of the opposite user group signals according to the guard time insertion between symbols is equal for the sub-carriers constituting one symbol.

$$T_g = (k/M) T_s \quad \text{[Equation 1]}$$

where $T_s$ is the length of the IFFT symbol; M is the number of parallel transmission symbols corresponding to an interleaving depth; and k is a nonnegative integer.

Figure 4:
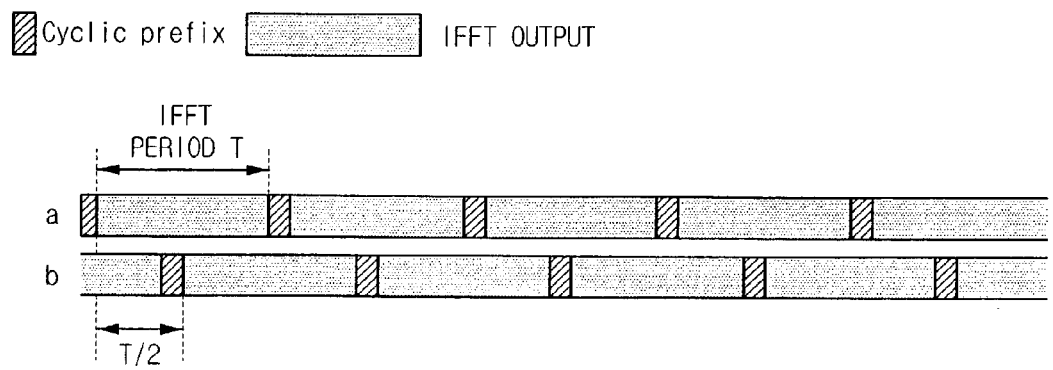
FIG. 4 is an offset timing diagram of signals of two user groups generated in the MC-CDMA system according to the embodiment of the present invention.

FIG. 4 shows a signal profile at positions "a" and "b" in FIG. 2. MC-CDMA signals of the user group A are generated at position "a", and MC-CDMA signals of the user group B are generated at position "b". As illustrated in FIG. 4, the signals of either group have a timing offset corresponding to the half-period of the symbol.

Figure 5:
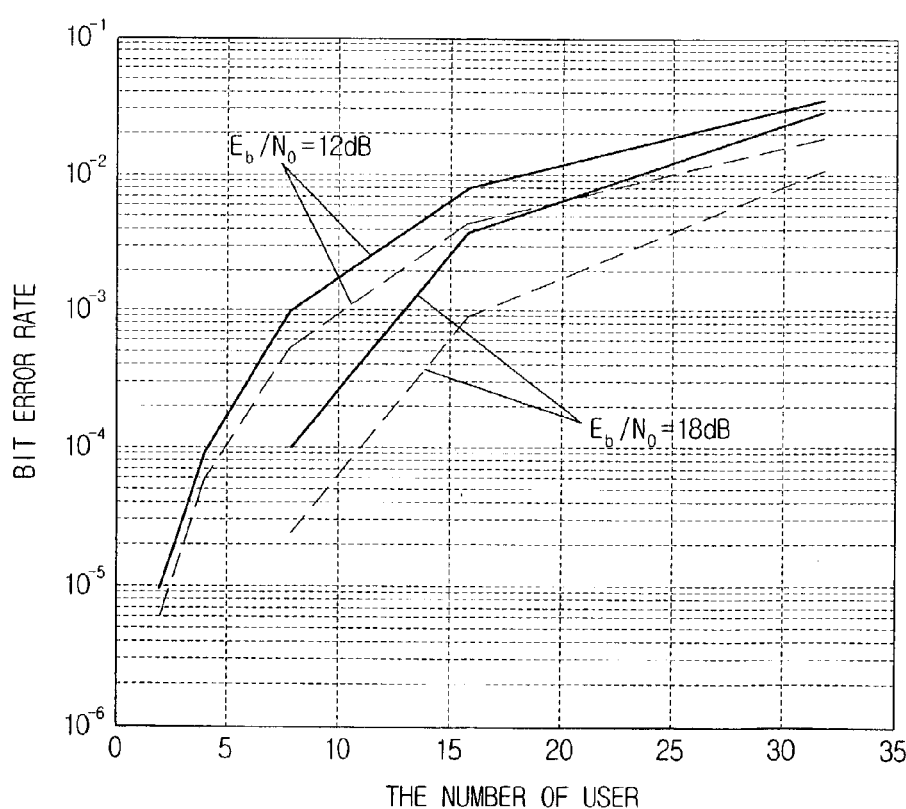
FIG. 5 is a diagram comparing a symbol error rate according to prior art with a symbol error rate according to the embodiment of the present invention.

FIG. 5 compares the symbol error rate of the MC-CDMA system between the prior art and the embodiment of the present invention, where the solid line represents the symbol error rate of the conventional MC-CDMA system, and the dotted line represents the symbol error rate of the MC-CDMA system according to the embodiment of the present invention.

As illustrated in FIG. 5, the signal generating method according to the embodiment of the present invention remarkably enhances the symbol error rate relative to the conventional MC-CDMA method. Additionally, the increment of the performance is enhanced due to the reduction of interference power increases with an increase in the signal-to-noise ratio (Eb/No).

Although the users are divided into two groups A and B in the above description, the embodiment of the present invention is not specifically limited and the users can be divided into more than two groups. But, a chip code processor and a symbol timing offset delaying section for compensating for the carrier frequency phase difference among the groups are additionally required, and the signals of each group are delayed by a time corresponding to the IFFT period divided by the number of the user groups.

While this invention has been described in connection with what is presently considered to be the most practical and preferred embodiment, it is to be understood that the invention is not limited to the disclosed embodiments, but, on the contrary, is intended to cover various modifications and equivalent arrays included within the spirit and scope of the appended claims.

As described above, for the purpose of reducing an interference signal among the users caused by non-orthogonality among the users in a frequency-selective fading environment, the MC-CDMA system according to the embodiment of the present invention divides the users into two groups and applies a symbol timing difference between the two groups of as much as a half-period of the symbol interval to cause a symbol transition of the opposite user group in the middle of the symbol interval, thereby reducing the multiple interference component included in a symbol decision variable after a chip combination.

What is claimed is:

1. A channel transmission symbol generating system for a multi-carrier communication system, comprising:
    a user grouping section for dividing users into a plurality of groups, each having a different symbol timing offset;
    a code spreader for allocating a different orthogonal code to each user, and spreading signals;
    an interleaver for interleaving a chip signal spread by the code spreader, among data symbols;
    a serial-to parallel converter for converting the interleaved chip signal into a parallel signal;
    an inverse fast Fourier transform (IFFT) section coupled to the serial-to-parallel converter to generate a multi-carrier output signal and output the same;
    a parallel-to serial converter for converting the output signal of the IFFT section in a serial transmission data form;
    a guard time inserter for inserting a guard time into the output signal of the serial-to-parallel converter; and
    a symbol timing offset delaying section for delaying the user group signals by predetermined timing offsets to differentiate a symbol timing among the user groups.

2. The channel transmission symbol generating system as claimed in claim 1, further comprising:
    a summation section for combining the signals of the plural groups output from the guard time inserter and the symbol timing offset delaying section.

3. The channel transmission symbol generating system as claimed in claim 1, further comprising:
    a chip code processor for converting the code of the interleaved chips of each user group so as to compensate for a phase difference caused by a delay difference among the user groups;
    a first switch for sequentially processing the group-based user signals fed into the IFFT section; and a second switch for sequentially inputting the group-based user signals output from the IFFT section into the parallel-to-serial converter.

4. The channel transmission symbol generating system as claimed in claim 1, wherein the user grouping section classifies the users so as to minimize a difference in the total transmission power among the groups.

5. The channel transmission symbol generating system as claimed in claim 3, wherein the user grouping section divides the users into a user group A and a user group B, the chip code processor converting the code of the interleaved output signals of the user group B, every other chip, the symbol timing offset delaying section delaying the symbol timing of the user group B by a half-period of the output signal of the IFFT section.

6. The channel transmission symbol generating system as claimed in claim 1, wherein the guard time added by the guard time insertion has a length given by the following equation:

$$T_g=(k/M)T_s$$

where $T_s$ is the length of the IFFT symbol; M is the number of parallel transmission symbols corresponding to an interleaving depth; and k is a nonnegative integer.

7. A channel transmission symbol generating method for a multi-carrier communication system, comprising:

(a) dividing users into a plurality of groups, each having a different symbol timing offset;

(b) allocating a different orthogonal code to each user to spread signals, and summing up the spread signals group by group;

(c) interleaving the spread chip signals among the data symbols for each user group and converting them to parallel signals;

(d) sequentially operating an Inverse Fast Fourier Transform (IFFT) on the converted parallel signals of each user group, and generating multi-carrier output signals;

(e) converting the IFFT signals in a serial transmission data form and inserting a guard time; and (f) delaying the signals of each user group with the guard time inserted therein by a predetermined time to differentiate the symbol timing of each user group, and summing up the signals of the group-based users.

8. The channel transmission symbol generating method as claimed in claim 7, further comprising:

(g) converting the code of the interleaved chips of each user group so as to compensate for a phase difference caused by a delay difference among the user groups in (d).

9. The channel transmission symbol generating method as claimed in claim 7, wherein the step (a) comprises classifying the users so as to minimize a difference in the total transmission power among the groups.

10. The channel transmission symbol generating method as claimed in claim 7, wherein the step (a) comprises dividing the users into a user group A and a user group B, the step (f) comprising delaying the symbol timing of the user group B by a half-period of the output signal of the IFFT section.

11. The channel transmission symbol generating method as claimed in claim 7, wherein the guard time added by the guard time added in (e) has a length given by the following equation:

$$T_g=(k/M)T_s$$

where $T_s$ is the length of the IFFT symbol; M is the number of parallel transmission symbols corresponding to an interleaving depth; and k is a nonnegative integer.

* * * * *